June 24, 1958 — U. A. WEBER, JR — 2,840,404
FASTENING DEVICE
Filed Aug. 19, 1954
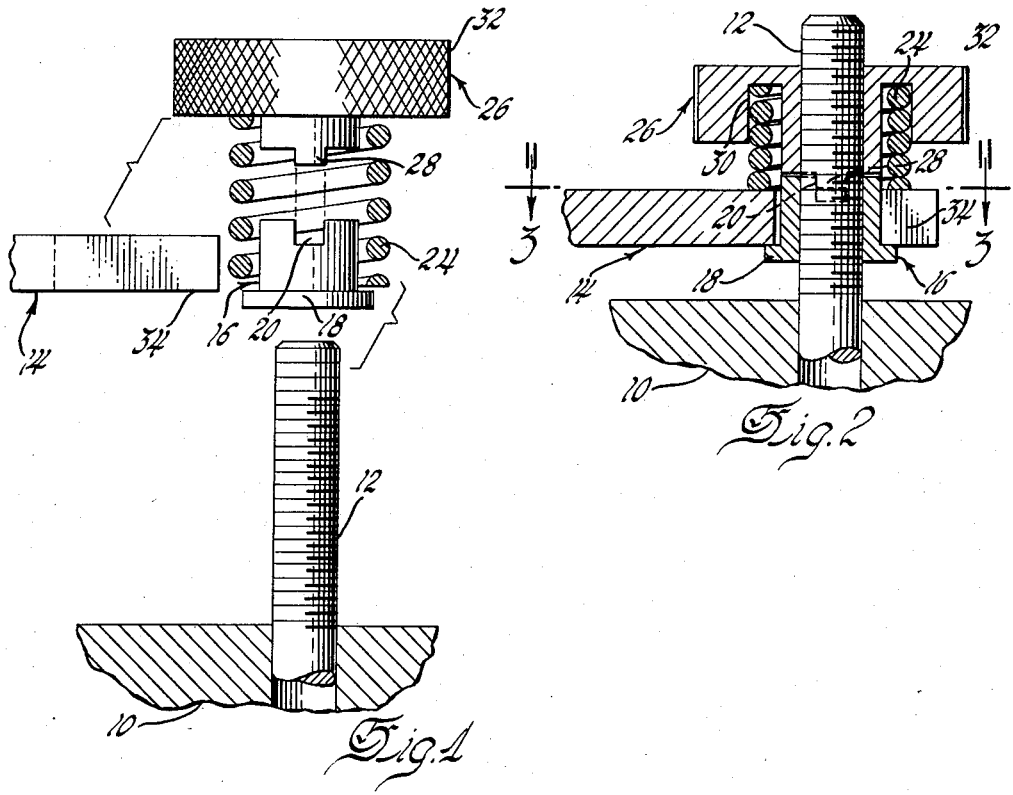
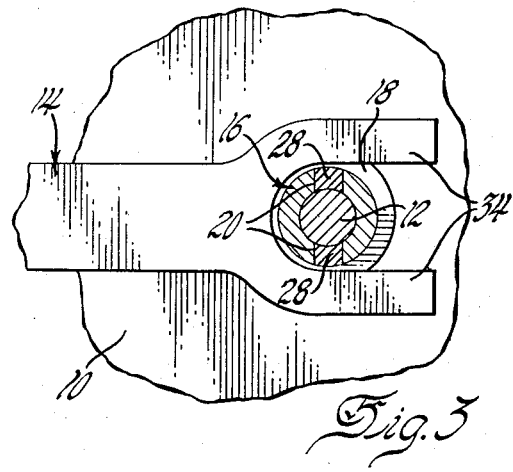
Inventor
Urban A. Weber, Jr.,
By L. D. Burch
Attorney

United States Patent Office 2,840,404
Patented June 24, 1958

2,840,404

FASTENING DEVICE

Urban A. Weber, Jr., Milwaukee, Wis., assignor to General Motors Corporation, Detroit, Mich., a corporation of Delaware Application August 19, 1954, Serial No. 450,950

8 Claims. (Cl. 287—93)

This invention relates to fastening devices, and more particularly to fastening devices adapted to secure members under predetermined spring tension and in a manner to permit pivotal and axial adjustment of one member with respect to another.

In mechanisms employing control levers, rods, and the like, it is necessary to connect one member at right angles to another member in such a manner that pivotal movement of one member within or about the other member is permitted. Devices for obtaining this result are common, having been satisfactorily employed for some time. One of the main objectives of devices of this type is to eliminate play in the joints, especially after the parts begin to wear. But even in devices of this kind where play is satisfactorily eliminated, malfunction often occurs due to misalignment between one part with respect to the other. This misalignment between the parts causes components of the desired forces to come into play which often result in interference between the parts so that the operation thereof becomes faulty in respect to timing and the like.

It is now proposed to provide a device not only wherein one member may be secured to another member in a manner to permit pivotal movement of one member about the other under spring tension to eliminate play between the parts, but in which there is additionally provided means for adjusting one member axially, or along the length of the other member without varying the predetermined spring tension desired between the parts.

In a preferred embodiment of the proposed device wherein a forked member is to be secured at right angles to a fixed threaded stud there is provided an internally threaded washer member having a radially extending flange at the end thereof first receiving the threaded stud for supporting the forked member. A thumb nut also adapted to be threaded on the stud is provided, with the nut having an annular recess surrounding the threaded portion thereof. A helical spring bears on the side of the forked member opposite the annular flange on the washer and extends from the forked member into the recess in the thumb nut. Lug and recess means are provided at the ends of the washer and thumb nut members for locking the washer and the thumb nut together against relative rotational and axial motion when these parts are threaded onto the stud so that the tension of the spring will not change in adjustment of the parts along the axis of the stud. The initial and thereafter constant tension of the spring is determined by the initial setting of the lug and recess means on the washer and thumb nut when the latter are applied to the stud. In this manner, the washer and the thumb nut may be moved axially of the stud in either direction so that the forked member will be retained between the washer and the spring under constant predetermined tension. The spring tension may be varied by changing the setting of the lug and recess means.

In the drawings:

Figure 1 is an exploded elevational view partly in cross-section of the essential elements of an assembly embodying the invention.

Figure 2 is a cross-sectional view of the assembled condition of the elements of the assembly shown by Figure 1.

Figure 3 is a cross-sectional view taken in the plane of line 3—3 of Figure 2 and looking in the direction of the arrows.

Referring to the drawings in greater detail, the preferred embodiment of the invention shown for purposes of illustration only comprises a supporting member 10 having a threaded stud 12 fixed thereto. A forked member 14 is to be secured to the fixed stud 12 so that the forked member 14 may pivot about the fixed stud 12 and be adjusted axially thereof. This may be accomplished by providing an internally threaded washer 16 having a radially extending flange 18 at the end thereof first receiving the stud 12 and, a notch or recess 20 across the diameter of the opposite end thereof, a helical spring 24 and a thumb nut 26 having a lug 28 across the diameter thereof at the end first receiving the threaded stud 12 and an annular recess 30 in the head portion 32 thereof for receiving the spring.

The washer 16 is first threaded part way on the end of the stud 12 so that the forked member 14 may be applied to the washer 16 so that the forks 34 thereof bear on the flange 18. The spring 24 is then applied over the internally threaded washer 16 so that the end thereof bears on the opposite side of the forks 34. The thumb nut 26 is then applied so that the other end of the spring enters into the recess 30 in the thumb nut 26 and the thumb nut is depressed against the pressure of the spring 24 so that the lug 28 enters the recess 20 in the washer 16. The thumb nut may then be screwed onto the end of the threaded stud 12. It will be noted that in so doing, the internally threaded washer 16 will also be turned with the thumb nut 26 and that the forked member 14 will travel axially of the stud 12 along with the fastener assembly. It is also evident that the amount of tension of the spring 24 against the forks 34 will be determined by the extent to which the lug 28 is inserted into the recess 20 and the relative initial rotation of a multiple of a half revolution between washer 16 and nut 26 prior to the threading of the thumb nut onto the threaded stud. It is also apparent that the various parts may be rearranged to a certain extent without departing from the scope of the invention, provided that the interlocking means between the washer 16 and the thumb nut 26 be disposed so as not to interfere with the bearing of the one end of the spring 24 against the member 14 being secured.

For instance, a plurality of lugs and recesses at the adjacent ends of members 26 and 16, respectively, may be provided to increase the fractional revolution range of adjustment of the tension in the spring 24 when engaged.

From the above specification and drawings it is apparent that there has been provided a fastening device for securing one member at right angles to another which, in addition to securing the one member under spring tension and permitting pivotal adjustment of that member, also permits axial adjustment of the one member with respect to the other member without varying the spring tension.

What is claimed is:

1. The combination of an externally threaded support member, a pair of internally threaded nut members on said support member, said nut members having interlocking means causing said nut members to rotate together, spring means compressed between said nut members and a supported member extending laterally with respect to said support member, said supported member being engaged between one end of said spring means and the adjacent nut member.

2. The combination of an externally threaded support and a pair of internally threaded nut members on said support, each of said nut members having an external flange near the end thereof opposite the other nut member, one of said nut members having a lug and the other of said nut members having a cooperating recess at the end thereof adjacent the other nut member, said lug being received by said recess to lock said nuts for rotation with one another, and compression spring means surrounding said nut members and bearing against said flanges, the compression of said spring means depending upon the axial spacing between said nut members and the spacing of said nut members depending upon the extent to which said lug is received by said recess.

3. The combination of an externally threaded support and a pair of internally threaded nut members on said support, each of said nut members having an external flange near the end thereof opposite the other nut member, one of said nut members having at least one lug and the other of said nut members having at least one cooperating radial recess at the end thereof adjacent the other nut member, said lug being received by said recess to lock said nuts for rotation with one another, and compression spring means between said nut members and bearing against said flanges, the compression of said spring means depending upon the axial spacing between said nut members and the spacing of said nut members depending upon the extent to which said lug is received by said recess.

4. The combination of an externally threaded support and a pair of internally threaded nut members on said support, each of said nut members having an external flange, one of said nut members having at least one lug and the other of said nut members having at least one cooperating recess at the end thereof adjacent the other nut member, said lug being received by said recess to lock said nuts for rotation with one another, and compression spring means between said nut members and bearing against said flanges, the compression of said spring means depending upon the axial spacing of said nut members and the latter depending upon the relative initial rotation between said nuts just prior to threading the last of said nuts on said support with said lug engaged in said recess.

5. The combination of an externally threaded first member, a second member and means for securing said second member to said first member for rotation about and adjustment along said first member, said means comprising a pair of nut members threaded on said first member, each of said nut members having an external shoulder and means cooperating with means on the other of said nut members for causing said nut members to rotate together as a unit, and spring means partially surrounding said nut members and extending between said shoulders, said second member being disposed between one of said shoulders and the adjacent end of said spring means.

6. A fastening device securing a movable member to a threaded fixed member under predetermined spring tension with the movable member being adjustable axially of and pivotally about the fixed member, comprising a pair of cooperating nut members threaded on said fixed member, said pair of nut members each having a shoulder thereon and together having radial lugs and recesses at the adjacent ends thereof, said lugs and recesses being engaged and causing said pair of members to rotate and advance along said threaded member without relative rotational or axial movement between one another, and spring means compressed between said shoulders on said pair of nut members and receiving the fixed member engaging portions of said pair of nut members, the spring tension of said spring means being determined by the extent to which said lugs are received by said recesses.

7. A fastening device securing a movable member to a threaded fixed member under predetermined spring tension with the movable member being adjustable axially of and pivotally about the fixed member, comprising a pair of cooperating nut members threaded on said fixed member, said pair of nut members each having a shoulder thereon and together having radial lugs and recesses at the adjacent ends thereof, said lugs and recesses being engaged and causing said pair of members to rotate and advance along said threaded member without relative rotational or axial movement between one another, and spring means compressed between said shoulders on said pair of nut members and receiving the fixed member engaging portions of said pair of nut members, the spring tension of said spring means being determined by the extent to which said lugs are received by said recesses, the latter being related to the relative initial rotation between said nut members just prior to threading the last of said nut members on said support with said lugs engaged in said recesses.

8. In securing a movable member with pivotal and lengthwise adjustment in respect to a fixed member while keeping all parts in physical contact under predetermined spring load to eliminate play, a fastening device comprising a pair of members having spring means therebetween, said pair of members being applied to and movable along said fixed member by rotationally advancing means, said pair of members having interlocking means theerbetween causing said members to rotate and advance together without relative motion therebetween, the tension of said spring means being determined by the initial setting of said interlocking means between said pair of members, said spring means being disposed externally of the fixed member engaging portions of said pair of members and permitting the engagement of said movable members between one end of said spring means and one end of one of said pair of members.

References Cited in the file of this patent
UNITED STATES PATENTS

| | | |
|---|---|---|
| 1,247,094 | Eibye | Nov. 20, 1917 |
| 1,930,783 | Watson | Oct. 17, 1933 |
| 2,054,468 | Pathier | Sept. 15, 1936 |
| 2,362,664 | Reed | Nov. 14, 1944 |
| 2,627,188 | Gaubatz | Feb. 3, 1953 |